(12) United States Patent
Shaikh et al.

(10) Patent No.: US 12,182,943 B2
(45) Date of Patent: Dec. 31, 2024

(54) GUIDANCE SYSTEM FOR THE CREATION OF SPATIAL ANCHORS FOR ALL USERS, INCLUDING THOSE WHO ARE BLIND OR LOW VISION

(71) Applicant: Microsoft Technology Licensing, LLC, Redmond, WA (US)

(72) Inventors: Saqib Shaikh, Redmond, WA (US); Eugene Seleznev, Hollister, CA (US); Rita Faia Marques, Cambridge (GB); Martin Philip Grayson, Cambridge (GB); Mikayla Brianne Jones, Bellevue, WA (US); Cecily Peregrine Borgatti Morrison, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 486 days.

(21) Appl. No.: 17/361,242

(22) Filed: Jun. 28, 2021

(65) Prior Publication Data

US 2022/0414988 A1 Dec. 29, 2022

(51) Int. Cl.
*G06T 19/00* (2011.01)
*G06F 3/16* (2006.01)
(Continued)

(52) U.S. Cl.
CPC ............... *G06T 19/003* (2013.01); *G06F 3/16* (2013.01); *G06T 7/0002* (2013.01); *G06T 7/251* (2017.01);
(Continued)

(58) Field of Classification Search
None
See application file for complete search history.

(56) References Cited

U.S. PATENT DOCUMENTS 10,178,303 B2 * 1/2019 Castillo ............... H04N 13/221
10,911,885 B1 2/2021 Chemistruck et al.
(Continued)

FOREIGN PATENT DOCUMENTS

CA 3161560 A1 * 6/2021 ............. G06T 17/00
WO WO-2016051366 A2 * 4/2016 ........... G06T 19/006
(Continued)

OTHER PUBLICATIONS

He, et al., "Spatial Anchor Based Indoor Asset Tracking", In Proceedings of IEEE Virtual Reality and 3D User Interfaces (VR), Mar. 27, 2021, pp. 255-259.
(Continued)

*Primary Examiner* — Tyler W. Sullivan
(74) *Attorney, Agent, or Firm* — Barta Jones, PLLC

(57) ABSTRACT

Disclosed herein are various methods for supporting guidance systems. In one example, a method receives image information of a surrounding environment of the user device at a first real-world location. Thereafter, the method determines, based on the received image information, what further information is needed to generate a spatial anchor point in the model. Subsequently, the method provides guidance information to the user device for capturing the further image information that is required to create a spatial anchor point, after which point the user device may implement the guidance information. Next, the method receives further information required from the user device for generating a spatial anchor point, and then a spatial anchor point is generated based on the exchanged information.

20 Claims, 7 Drawing Sheets

(51) Int. Cl.
  *G06T 7/00* (2017.01)
  *G06T 7/246* (2017.01)
  *G06T 7/73* (2017.01)
  *G06V 30/14* (2022.01)
  *H04N 23/60* (2023.01)
  *H04N 23/698* (2023.01)

(52) U.S. Cl.
  CPC ............ *G06T 7/75* (2017.01); *G06V 30/1448* (2022.01); *H04N 23/64* (2023.01); *H04N 23/698* (2023.01); *G06T 2207/20101* (2013.01)

(56) References Cited

U.S. PATENT DOCUMENTS

| | | | |
|---|---|---|---|
| 11,282,404 B1* | 3/2022 | Yang | G06F 3/013 |
| 2014/0273834 A1 | 9/2014 | Merckling | |
| 2014/0327792 A1 | 11/2014 | Reitmayr et al. | |
| 2014/0368620 A1 | 12/2014 | Gu et al. | |
| 2016/0005211 A1 | 1/2016 | Lin et al. | |
| 2017/0208245 A1 | 7/2017 | Castillo et al. | |
| 2017/0251143 A1 | 8/2017 | Peruch et al. | |
| 2017/0287218 A1* | 10/2017 | Nuernberger | G06F 3/04845 |
| 2018/0285052 A1* | 10/2018 | Eade | B65G 1/0492 |
| 2019/0340836 A1 | 11/2019 | Ynen et al. | |
| 2019/0355177 A1 | 11/2019 | Manickam et al. | |
| 2020/0175764 A1* | 6/2020 | Romea | G06T 7/73 |
| 2020/0273235 A1 | 8/2020 | Emami et al. | |
| 2020/0302510 A1* | 9/2020 | Chachek | G06Q 30/0639 |
| 2020/0342683 A1* | 10/2020 | Panec | A63F 13/327 |
| 2020/0357182 A1 | 11/2020 | Ahuja et al. | |
| 2021/0241532 A1* | 8/2021 | Daniels | G06T 19/006 |
| 2021/0271882 A1* | 9/2021 | Waicberg | H04L 65/1069 |
| 2021/0374978 A1* | 12/2021 | Döring | G06T 7/33 |
| 2022/0044016 A1* | 2/2022 | Pan | G06T 19/006 |
| 2022/0078385 A1* | 3/2022 | Yeung | H04N 25/61 |
| 2022/0110088 A1* | 4/2022 | Bao | G01S 5/0205 |
| 2023/0260240 A1* | 8/2023 | Jayaram | H04N 13/243 |

FOREIGN PATENT DOCUMENTS

| | | | |
|---|---|---|---|
| WO | 2020011978 A1 | 1/2020 | |
| WO | 2021021585 A1 | 2/2021 | |
| WO | WO-2022019955 A1 * | 1/2022 | ............ G06F 3/011 |

OTHER PUBLICATIONS

Zhao, et al., "The Effectiveness of Visual and Audio Wayfinding Guidance on Smartglasses for People with Low Vision", In Proceedings of the CHI Conference on Human Factors in Computing Systems, Apr. 25, 2020, 14 Pages.

"International Search Report and Written Opinion Issued in PCT Application No. PCT/US22/030460", Mailed Date: Aug. 31, 2022, 13 Pages.

* cited by examiner

GUIDANCE SYSTEM FOR THE CREATION OF SPATIAL ANCHORS FOR ALL USERS, INCLUDING THOSE WHO ARE BLIND OR LOW VISION

BACKGROUND

Models may be used to recreate portions of real-world environments. A model may be generated and accessible via software of a computing device. Using a model mapped to a portion of a real-world environment, navigation information may be generated based on a user's corresponding position in the model. This navigation information can then be provided to a user to navigate in the real-world.

Image receiving equipment of computing devices can be used to capture images. These images may be converted into representations of the surrounding environment of the user.

Spatial anchors can be generated in a model of a real-world environment. These spatial anchors can be used as start and end points of navigation information provided to a user of a model of the real-world environment.

SUMMARY

According to a first aspect disclosed herein, there is provided a method for building up a model of a real-world environment. The method may comprise receiving, from a user device at a first real-world location, first image information of a surrounding environment of the user device. The method may then comprise determining further image information of the surrounding environment of the user device at the first-real-world location, wherein the further image information is required for generating a spatial anchor in the model, wherein the spatial anchor point links the first real-world location of the user device to a corresponding location in the model. The method then provides guidance information to the user device for capturing the further image information, and in response receives the further image information from the user device. The method then generates a spatial anchor point in the model based on the first image information and the further image information. Following generation of the spatial anchor point, the spatial anchor point is discoverable to one or more users of the model to provide information of the first real-world location.

The method of the first aspect may be computer-implemented. The method may be performed by one or more applications of a user device.

According to a second aspect, there is provided an apparatus comprising at least one processor; and at least one memory including computer program code, the at least one memory and computer program code configured to, with the at least one processor, cause the apparatus to perform the method of the first aspect.

According to a third aspect, there is provided computer-readable storage device comprising instructions executable by a processor for performing the method of the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

An example application provides at least part of model to a user which is mapped to part of the real world. A user can access the model through a user device and use this to navigate in the real world. The user can access the model through an environment model application. This can help users, in particular (but not limited to) users who can interact with and receive presentation more easily from the model than from the real world. Such users may have low or limited vision, for example.

In some examples, the model may be considered to be a virtual representation or "virtual world" representing the portion of the real-world which is mapped to the model.

A user application may be used to navigate in the real-world based on the model. The user may use the same application, or a different application, to build up the model and to add spatial anchor points into the model. In some examples, the application(s) may be considered to be environment model application(s). The application(s) may be hosted and provided over one or more devices.

Spatial anchors are a key technology for the creation of indoor navigation systems, or for navigation systems of other spaces (e.g. of an outdoor location). The spatial anchors points are re-detectable by devices that support use of spatial anchors. Existing guidance for creating robust spatial anchors is visual, often asking users to seek out specific types of features in a space or move around a space in a manner such as to capture certain types of features from different perspectives. Creating spatial anchors can be challenge for users who are blind or have low vision. These are likely to be the very users who benefit from navigation systems based on models.

From a pose (a position and an orientation) of a user's camera at a spatial anchor point, the environment model application can determine where and how the user's camera is orientated in the spatial anchor point. The environment model application can use this information to guide a user to a different spatial anchor point, using the current spatial anchor point as a starting point.

Figure 1:
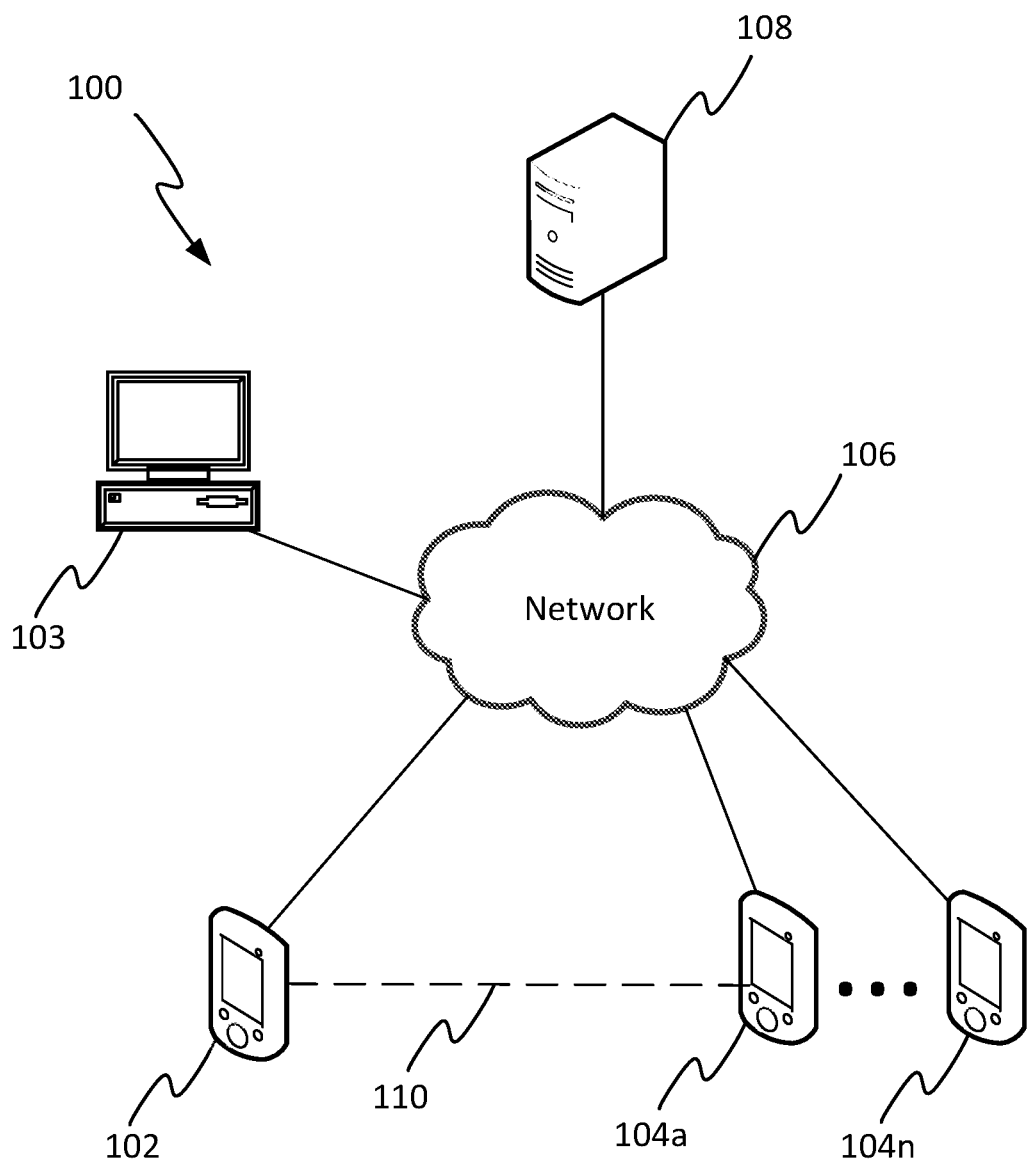
FIG. 1 shows an example system where an environment model application may be used.

FIG. 1 shows an example system 100 that may be used to implement some examples of the invention. It will be appreciated that system 100 is not limited to only the apparatuses shown in FIG. 1. The environment model application may be accessed by each of the devices in system 100 and may be hosted other one or more devices in system 100.

User device 102 may comprise any suitable user device for accessing a model of the real-world environment. For example, user device 102 may comprise a mobile phone, smartphone, head mounted device (HMD), smart glasses, smart wearable technology, laptop, tablet, HoloLens, etc.

User device 102 may communicate with one or more other user devices 104a to 104n. Through such communication, real world information that is captured by user device 102 can be received at user devices 104a to 104n. The model information may be mapped to the real-world information and generated based on the real-world information. In some examples, real world information captured by user device 104a may first be stored in one or more data storages (such as data store 108) before being mapped and converted to the model. Data store 108 may comprise one or more servers.

The real-world information captured by user device 102 may comprise image information of the surrounding environment of user device 102. The image information can be converted by one of the devices in system 100 to geometry information of the surrounding environment of user device 102. In some examples, the geometry information may comprise recognized objects at the location of the user device capturing the real-world information. The geometry information may also comprise distances and angles at which certain objects are at the location of user device capturing the real-world information.

User device 102 may communicate one or more of real-world information and model information captured by user device 102 to data store 108 via a network 106. Network 106 may comprise an internet network, internet of things (IoT) network or any other suitable communications network for communicating information between entities in system 100.

As shown at 110, in some examples user device 102 may communicate directly with user devices 104a and 104n. Communication at 110 could be made using Bluetooth or any other suitable communications technology.

Each user device 102, 104a, 104n may comprise image receiving equipment such as one or more cameras. The image receiving equipment may be a part of the respective user device, or in some examples the image receiving equipment may be separate to the respective user device but connectable to the respective user device for sending image information.

System 100 may also comprise one or more computing devices 103, which may perform one or more steps of the environment model application. The one or more computing devices 103 may comprise at least one processor and at least one memory, as well as other components.

Figure 2:
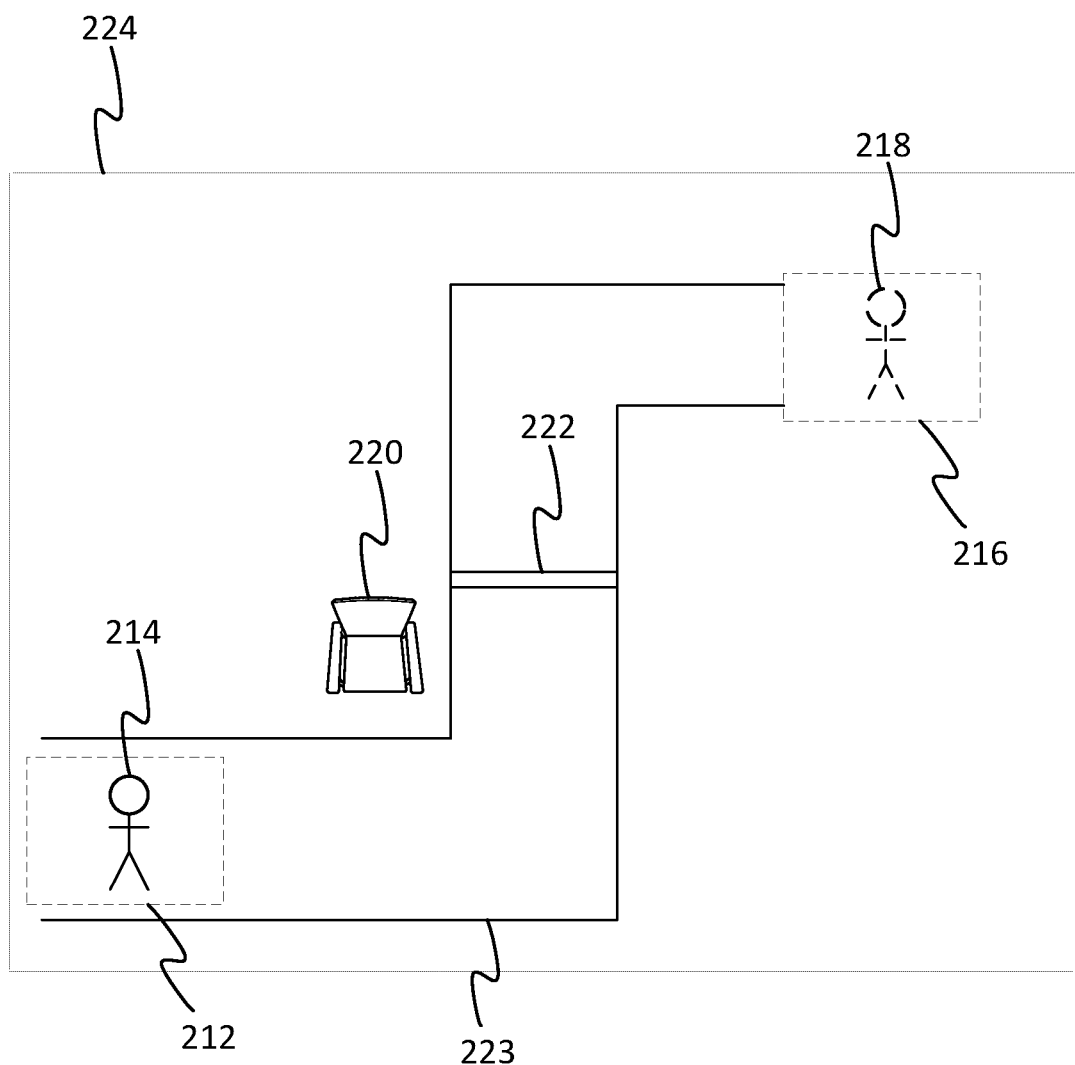
FIG. 2 shows an example plan of an environment where an environment model application may be used.

FIG. 2 shows an example plan view of a real-world area 224. Real-world area 224 may be mapped to a model accessible by a user device using an environment model application (e.g. any of user device 102, 104a, 104n as described above with respect to FIG. 1). The model may be considered to be a "digital twin" of real-world area 224.

A user 214 may start at a first location 212 in real-world area 224. In the model mapped to the real-world area 224, the first location may be a spatial anchor point. Spatial anchors in the model can be used to give a user a starting point or finishing point mapped to real-world area 224. User 214 may intend to move from first spatial anchor 214 to a second spatial anchor 216. Second spatial anchor 216 is mapped in the model to a second location in real-world area 224.

User 214 can use a user device such as user device 102, 104a and 104n to navigate from spatial anchor 212 to spatial anchor 216. The navigation between the two points corresponds to user 214 moving in real-world area 224 to move correspondingly in the model mapped to real-world area 224.

While navigating in the model, a user device can detect where user 212 is in real-world 224 and can then use information of the model to provide corresponding instructions to the user to navigate between the two spatial anchors 214 and 216. The user device may be able to detect where user 214 is in real-world area 224 using a camera in the user device to detect image information of real-world area 224, for example. This image information may then be compared with information of the mapped model to determine where the user is in the model. The user's location can also be determined based the initial starting point of user 214 at spatial anchor 212 and speed and direction measurements from accelerometer and gyroscope readings of the user device of user device 214. GPS measurements could also be used in some examples.

While navigating, the user may experience an augmented reality (AR) experience based on information recorded in the model. The AR experience may be provided using an image receiving apparatus of a user device and one or more output components of the user device. The model may provide instructions to a user to navigate in between spatial anchor points. The instructions may be provided haptically or using audio.

From model information of the mapped area, which may be determined by previous journeys by user 214 or by other users between spatial anchor points 212 and 216 or input my one or more users of the model, the model can provide information to user 214 when to turn right or left to avoid obstacles (such as chair 220 for example) or to navigate spatial constraints in real-world area (such as corridor 223 for example). The model can also provide instructions for a user 214 to interact with real-world area 224 to navigate real-world area 224. For example, instructions telling a user to interact with an object (e.g. open a door 222) as they approach the object can be provided to user 214.

Instructions provided to a user to navigate real-world space 224 based on a mapped model could be provided by at least one of: audio information from a user device; haptic information (haptic feedback) from a user device.

A user's position in real world area 224 may be determined using accelerometer and gyroscope measurements and combining this information with the position of the spatial anchor point as a starting point to determine where a user 214 currently is. Image information from a camera of user device may also be used to determine where the user 214 is in the model, and there the user's corresponding real-world position. Any other suitable information may also be used to determine where a user 214 is in the real-world, and therefore based on the mapped model how the user should navigate in real-world area 224.

In some examples, a user will specify a spatial anchor point that they wish to navigate to. For example, spatial anchor point 216 may comprise a bathroom, a different room of a building, an exit point of a building, etc. User 214 may use a user device to input that they wish to navigate to spatial anchor 216, so that they will be in position 218 in real-world area 224.

As instructions to user 214 are based on a starting point, which corresponds to first spatial anchor point 212, and a finishing point, which corresponds to a second anchor point 216, it is important that the information of a spatial anchor point is fully and accurately captured. From this information, instructions can be provided to guide a user from a starting point at a spatial anchor to a finishing point at another spatial anchor, based on a user's starting pose (orientation and position) at the starting point. If anchor point 212 were to be missing information, the instructions provided to user 214 based on the model may be inaccurate and could in some cases even place a user 214 in danger if they were instructed to turn left or right at the wrong time or were not warned of the presence of an object (e.g. chair 220 or door 222) in real-world area 224. It is therefore important that anchor points are captured correctly when input into a model mapped to a real-world area.

Spatial anchor points may be captured by a user (e.g. user 214) using a user device, such as the user devices shown in FIG. 1. Image information from a user device can be used to provide information of the spatial anchor point. Such image information may comprise at least one of: at least one image; video information.

Based on the received image information, a spatial anchor point can be created in the mapped model. The anchor point could be created by the user device receiving the image information and the user device creating the spatial anchor point, or the image information could be sent to one or more computing devices (such as computing device 103 shown in FIG. 1) which create the spatial anchor point. In some examples, image information may be stored at a data store 108 before or after conversion to a spatial anchor point.

Based on a spatial anchor point and further image information received from a camera, in some examples a user device may be able to determine a user's orientation at the spatial anchor point or the user's exact real-world location within the spatial anchor point. For example, a user device may be able to determine that a user is facing in an incorrect direction to start navigation to a desired second spatial anchor point. A user device may also be able to determine that a user is not at the center of a spatial anchor point.

Spatial anchor points may be created by one or more users of the model by inputting image information from a user device at a first location. This image information is then converted into geometry information of the surrounding environment of the first location. In some examples, a user may use a user interface of the environment model application to indicate that they wish to create a new spatial anchor point. An application of the user device may then receive image information of the surrounding environment of the user from an image receiving equipment (e.g. a camera). The environment model application can provide instruction (guidance) information to the user to help the user to capture further image information required to create the spatial anchor point. This can help the world application to capture information missing from first image information that is received from the user device. The user can then use the user device to follow the guidance information to capture the missing information, so that a spatial anchor point can be created.

The guidance information can be provided via the user's user device. The instruction information may comprise audio information. The instruction information may comprise haptic feedback.

In some examples, methods such as Simultaneous Localization and Mapping (SLAM) may be used to construct a spatial anchor point based on the received image information. Other suitable methods can be used.

Image information received from a user device can be used to recognize and determine objects in a spatial anchor. Any suitable object recognition method can be used. Depth information can also be determined from the received image information using known techniques, such as a triangulation method or phase shift algorithm.

After receiving image information from an image receiving equipment, it may be determined by the user device that further image information is required to create a spatial anchor point. This determination may be based on one or more of:

at least one quality thresholds of the image information not being met, so that it needs to be provided again at a better quality;

a determination that there is not sufficient image information for part of a recognized object;

a determination that the angle covered by the image information is insufficient (for example, less than 360 degrees). In some examples, this determination may be based on the speed of movement of an image receiving equipment during image information capture;

a determination that a user has not completed a movement of the image receiving equipment corresponding to a shape instructed to the user.

Figure 3:
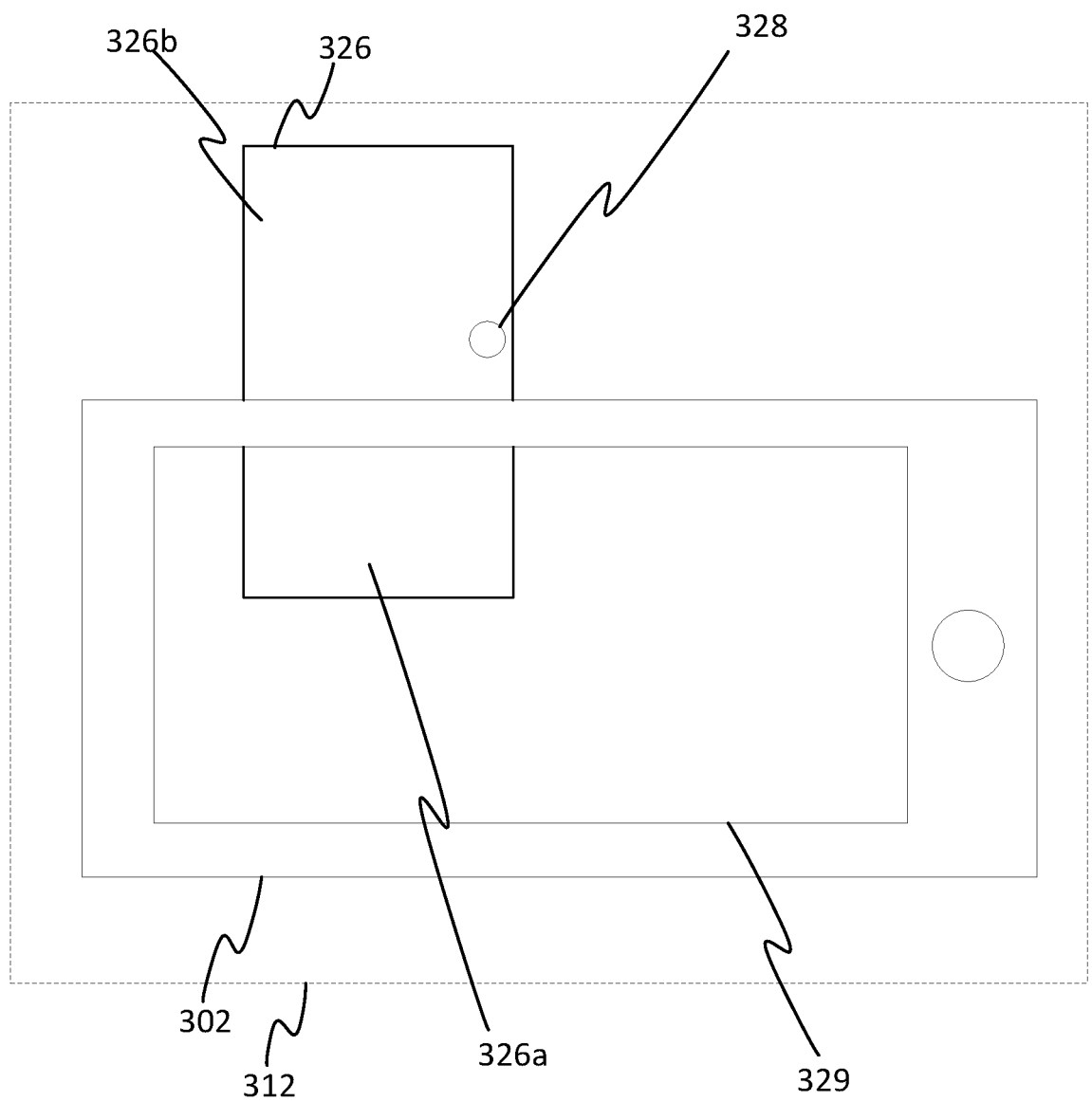
FIG. 3 is a schematic representation of an example of capturing image information for generation of an anchor point in a model.

FIG. 3 shows an example view 312 that a user (e.g. user 102, 104a or 104n) may have when capturing image information for a spatial anchor point.

The user may use a user device 302 with a display 329. At least part of display 329 may show image information captured by device 302 (the image information may be captured using an image capturing equipment such as a camera). In some examples, the image capturing equipment may be a part of user device 302. In some examples, the image capturing equipment may be separate from user device 302.

The image information shown on display 329 may comprise a first part of image information received by an application creating a spatial anchor point. The application may recognize an object such as door 326. The object may be recognized using neural network approaches such as Region Based Convolutional Neural Networks (R-CNN) for example or non-neural network approaches such as Scale-invariant feature transform (SIFT) algorithm. The environment model application may determine that the whole of object 326 is not visible, for example that only a part of door 326a is visible. The environment model application may determine that part of object 326 is not visible, for example that a doorknob 328 cannot be identified. In some examples, the environment model application determine that the image information received does not meet one or more quality thresholds (discussed further below). The application may then provide guidance information to the user to move user device 302 to capture further image information, such as images comprising the remainder 326b of object 326 or an important object for interaction such as object 328 (in this example, a doorknob).

When the application receives the further image information that the user provides based on the guidance information, the application can create a spatial anchor point.

In some examples, the guidance information may comprise instructions to re-orientate the image capturing equipment, for example if it is too tilted. In such an example, it may have previously been determined that the image capturing equipment was too tilted based on gyroscope information from the image capturing equipment.

In some examples, where a user captures image information while moving image capturing equipment, the guidance information may comprise instructions to move the camera more slowly. In such an example, it may have previously been determined that the image capturing equipment was being moved too fast based on accelerometer information from the image capturing equipment.

In some examples, the guidance information may comprise instructions to change a lighting condition of the surrounding the image capturing equipment, for example if the environment was poorly illuminated. In such an example, it may have previously been determined that the environment was too dark based on light detecting equipment of the user device 302 or image capturing equipment.

In some examples, the guidance information may comprise instructions to change a setting of the surrounding the image capturing equipment, for example if the environment was poorly illuminated (e.g. guidance information may comprise instructions to change the image capturing environment to a low light setting used for capturing images in low light). In such an example, it may have previously been determined that the environment was too dark based on light detecting equipment of the user device 302 or image capturing equipment.

The guidance information may be provided following a determination by the application that a first portion of image information does not satisfy one or more quality threshold. The one or more quality thresholds may comprise one or more quality thresholds may comprise at least one of: a minimum light level threshold of the surrounding environment of the user device; a maximum speed of movement threshold of the user device; one or more maximum tilt angle thresholds of the user device; a minimum coverage level threshold of a 360 degree view of the surrounding environment of the user device.

In some examples, in order for a user to capture image information for creating a spatial anchor point, the application may require image information over a greater angle than image information initially provided to an application. The guidance information may guide the user to provide the further required image information.

In some examples, in order for a user to capture image information for creating a spatial anchor point, the application may require image information of a full 360-degree view of the environment.

Figure 4:
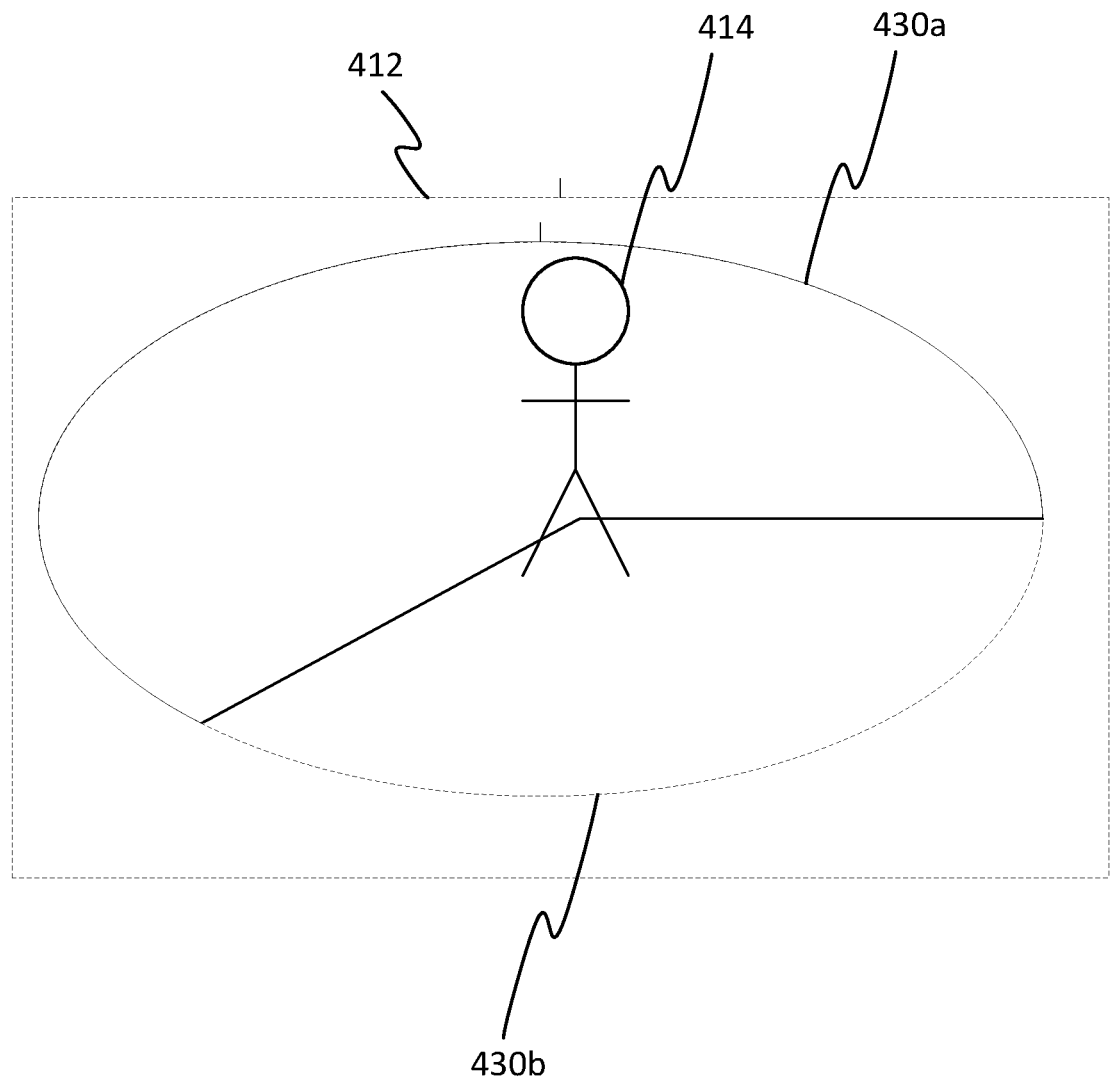
FIG. 4 is a schematic representation of an example of capturing image information for generation of an anchor point in a model.

FIG. 4 shows an example where a user 414 has used image receiving equipment (for example, a camera of a user device) to capture image information of a first angle 430a of a potential spatial anchor point 412.

In some examples, image information of the first angle 430a of potential spatial anchor point 412 is captured by an image receiving equipment in a single position. The image receiving equipment may be part of a user device or may be separate from a user device but able to communicate image information to an application of the user device.

In some examples, image information of the first angle 430a of potential spatial anchor point 412 is captured by an image receiving equipment in more than one position. In such an example, user 414 may move the image receiving equipment while capturing image information of potential spatial anchor point 412.

The application may be determined that more image information from further angles of potential spatial anchor point 412 is required. In some examples, it may be determined that image information over a further angle 430b is required to create a spatial anchor point.

When it is determined that more image information from further angles of potential spatial anchor point 412 is required, the application may provide guidance information to a user to rotate the image receiving equipment to capture the further angles of the spatial anchor point. The guidance information may comprise audio information. The guidance information may comprise haptic information. For example, the application providing the guidance information may instruct the user to capture further angle 430b.

The application may determine that a full 360-degree image information has not been captured by calculating the first angle 430a captured by the user. Such a calculation may be based on the angle at which the image receiving equipment captures images and an orientation of the image receiving equipment (based on e.g. gyroscope information). In examples where the image receiving equipment is stationary during image information capture, the calculation may be based on the angle at which the image receiving equipment captures images and the orientation of the image receiving equipment. In examples where the image receiving equipment is not stationary during image information capture, the calculation may also be based on the speed at which the image receiving equipment is moved during image information capture (e.g. based on accelerometer readings) and the time over which the image information is captured.

In some examples, image information over angle 430a may be determined by combining more than one image.

In some examples (such as the example shown in FIG. 4) the sum of first angle 430a and further angle 430b is 360 degrees. This can be useful following generation of a spatial anchor point, as from the generated spatial anchor point and image information from a user using the spatial anchor point as a start point or end point of a journey, the orientation of the user at the spatial anchor point can be determined irrespective of the user's initial orientation.

Providing guidance information to help a user capture a spatial anchor point can be useful in situations where a user has low or limited vision, and as such may have difficulty in reviewing image information used to create the spatial anchor point.

Spatial anchor points generated using any of the methods described above may be discoverable by one or more users of an application following generation of the spatial anchor point. Spatial anchor points may also be "re-discoverable" by the user who captured the image information for generating the spatial anchor point.

According to some examples, upon generation of a spatial anchor a user may annotate the spatial anchor point in the model. Such annotation can be used to provide further information of the spatial anchor point that can be provided to users of the model, for example a name or description of the spatial anchor point.

According to some examples, a user is not required to walk to other locations in order to capture a spatial anchor point. A user may be required to turn around, but not to walk to another location. This may be useful for users who have low or limited vision, as they may have not be able to access usual guidance devices easily while operating the image receiving equipment of a user device.

Figure 5:
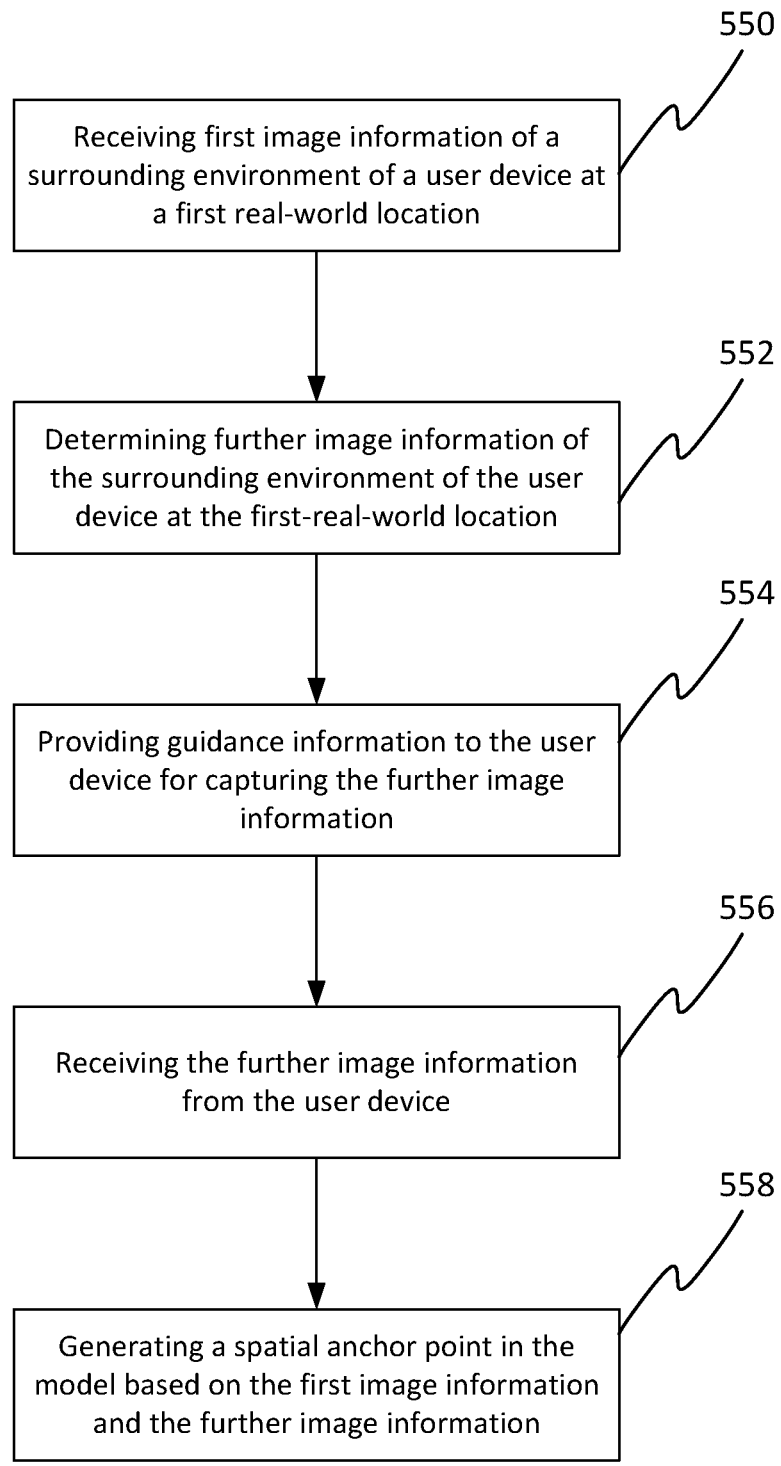
FIG. 5 is a flow chart of a method of capturing image information for generation of an anchor point in a model.

FIG. 5 shows an example method flow. The method may be performed by a user device such as user device 102 for example. The user device may belong to a user such as user 214 or 414 for example.

According to some examples, the method of FIG. 5 is performed by a single user device. In other examples, the method may be performed by a computing device (e.g. computing device 103) connected to user device for receiving image information. In other examples, the method may be performed partly by the user device and partly by a computing device.

At 550, image information of a surrounding environment of a user device at a first real-world location is received. At

552, based on the received image information, it is determined what further information is needed to generate a spatial anchor point in the model. For example, it may be determined that information that is required to create a spatial anchor point is completely missing. In other examples, it may be additionally or alternatively determined that the image information that has been received is not high enough quality (does not meet minimum quality thresholds) and needs to be replaced by higher quality image information.

At 554, the method comprises providing guidance information to the user device for capturing the further image information that is required to create a spatial anchor point. In some examples, the guidance information may direct a user to move an image receiving equipment (e.g. camera) in a certain way to capture the required image information. In some examples, the guidance information may comprise directions to change a setting of the image receiving equipment. In some examples, the guidance information may comprise directions to change a property of the surrounding environment (e.g. the level of light).

Following 554, the user may implement the guidance information. At 556, the further information required from the user device for generating a spatial anchor point is received. At 558, the spatial anchor point in the model is then generated based on the first image information and the further image information.

Following the method of FIG. 5, the generated spatial anchor point may be discoverable by one or more users using the model. This the one or more users to navigate to and/or from the generated spatial anchor point.

Figure 6:
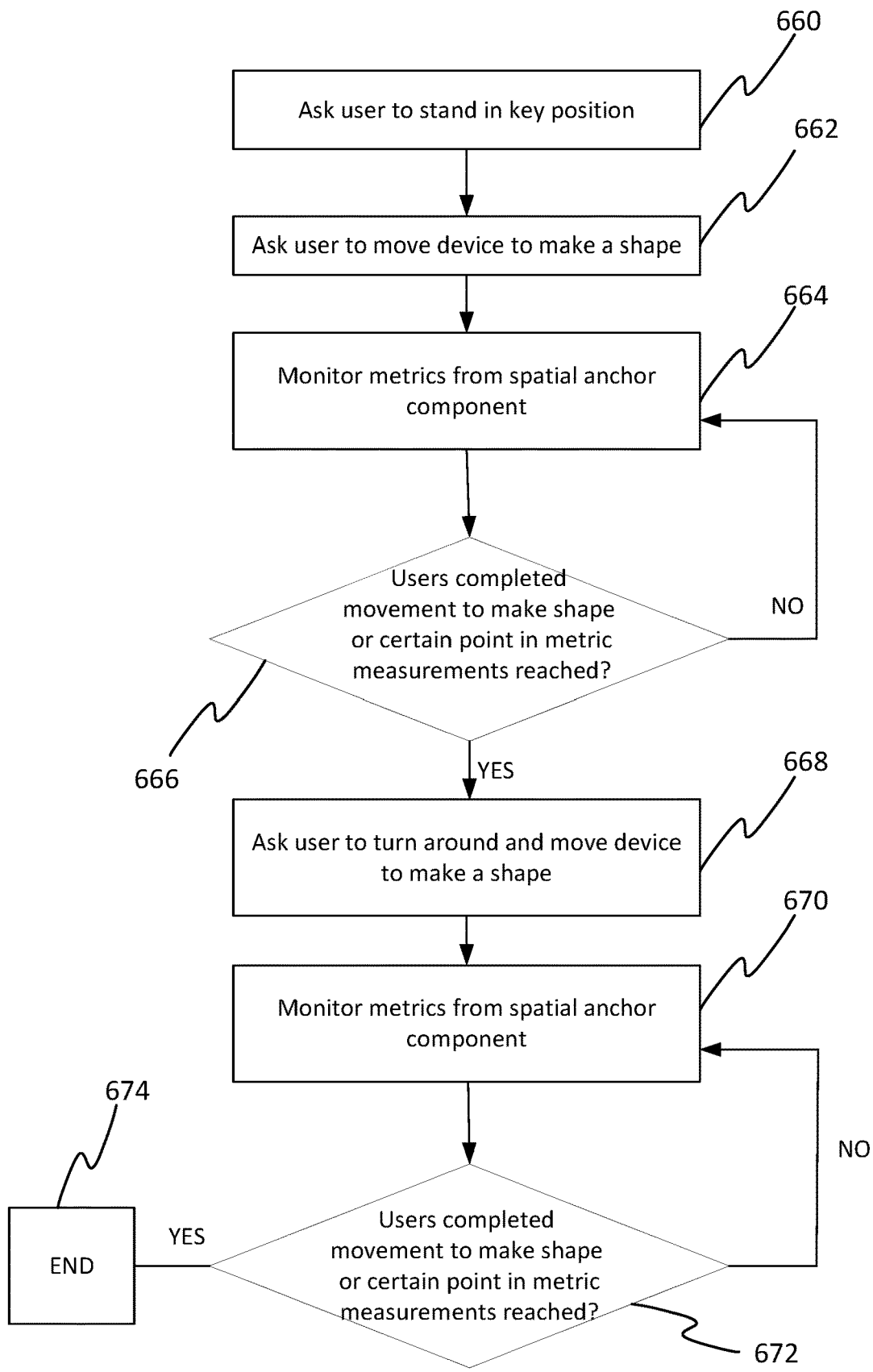
FIG. 6 is a flow chart of a method of capturing image information for generation of an anchor point in a model.

FIG. 6 shows an example method comprising guidance provided to a user for capturing a spatial anchor point. The method may be performed by a user device such as user device 102 for example. The user device may belong to a user such as user 214 or 414 for example.

At 660, a user is asked to stand in a position (location) at which they want to capture a spatial anchor point. This position may be considered to be a "key position". A user may not be required to move from the key position to complete the capture of image information for a spatial anchor point, but may be required to face different directions while located at the key position.

At 662, the user device asks a user to move image receiving equipment, which may be integral to the user device or a separate apparatus. The user may be asked to move the image receiving equipment in a certain shape, for example to draw a circle in the air. In some examples, the user may be asked to draw a sphere in the air. Other shapes such as a: square; a rectangle; an ellipse; a triangle may be used. In some examples, the user may be asked to draw a shape (e.g. a circle) between waist and head height.

At 664, the method comprises monitoring metrics from spatial anchor components. This may involve measuring angle covered by received image information. This may also involve measuring whether certain quality thresholds are met. The speed of the movement of the image receiving equipment may also be determined in some examples. If the image receiving equipment is being moved more slowly than a threshold speed, a request may be made for the user to move the image receiving apparatus more quickly. If the image receiving equipment is being moved faster than a threshold speed, a request may be made for the user to move the image receiving apparatus more slowly.

At 664, a tilt of the image receiving equipment may also be determined based on gyroscopic readings, and if the image receiving equipment is too tilted instructions may be provided to the user to correct this.

At 666, it is determined whether the user has completed the movement instructed at 662 or whether a certain point in metric measurements of the spatial anchor components has been reached. For example, it may be determined that a certain angular range of the spatial anchor point has been determined. If neither of these requirements are met, the method repeats 664. If one or both requirements have been met, the method moves on to 668.

At 668, the user device requests the at user turns around and moves the image receiving equipment (or user device when the image receiving equipment is a part of the user device) to make another shape. The shape may be the same as instructed at 662.

At 670, metrics of spatial anchor components are monitored in a similar way to 664.

At 672, it is determined whether the user has completed the movement instructed at 668 or whether a certain point in metric measurements of the spatial anchor components has been reached. For example, it may be determined that a certain angular range of the spatial anchor point has been determined. If neither of these requirements are met, then the determination in step 672 is a "NO." and the method repeats 670. If one or both requirements have been met, then the determination in step 672 is a "YES," and the method moves on to 674.

At 674, the method determines that there is enough information to generate a spatial anchor point. A spatial anchor point may then be generated.

The guidance at 660, 662 and/or 668 may be provided by a user device as audio information or haptic feedback.

Figure 7:
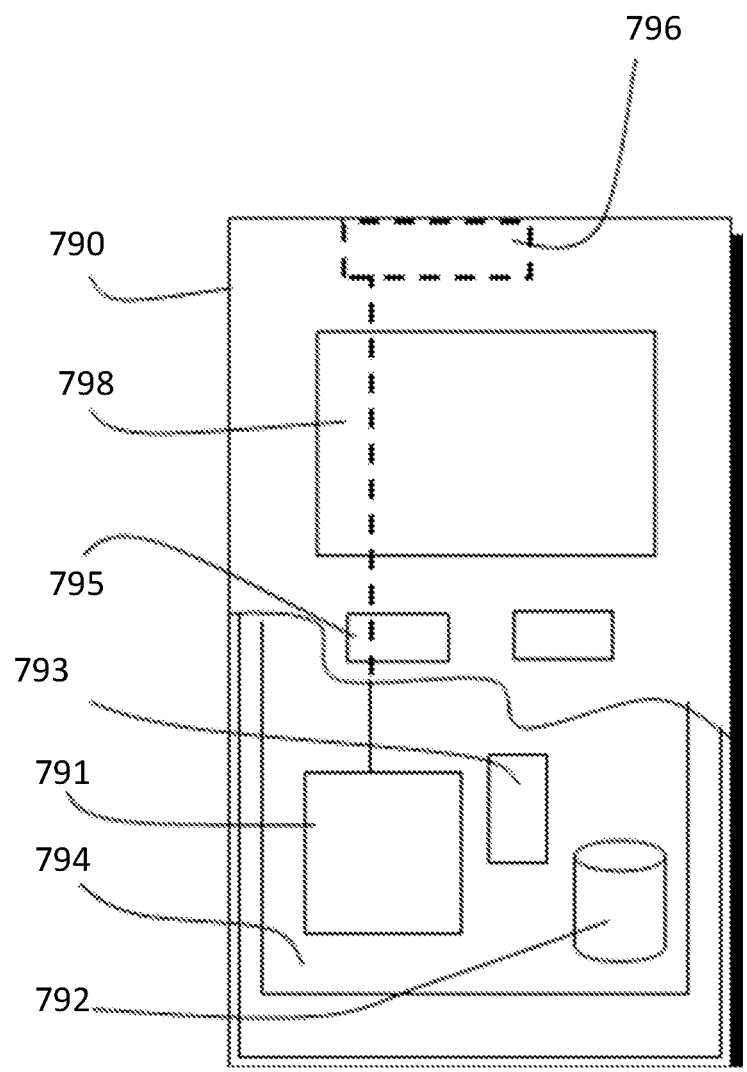
FIG. 7 is an example of a user device.

A possible architecture for a user device 790 implementing the invention is shown in FIG. 7. It will be understood that user device 790 may comprise additional circuitry to that shown in FIG. 7. It will also be understood that a user device need not comprise all the features of FIG. 7.

User device 790 may be capable of wireless communication. User device 790 can connect to one or more networks. User device 790 may receive signals over an air or radio interface. A transceiver apparatus is shown schematically at block 796. The transceiver apparatus may be arranged internally or externally to user device 790.

User device 790 may comprise at least one processor 791, at least one memory 792 and other possible components 793 for user in software or hardware aided execution of tasks. Other possible components 793 may include one or more image receiving apparatuses (e.g. one or more cameras). The other possible components may be able to store data to memory 792. Data processing, storage and other control apparatuses can be provided on an appropriate circuit board or in chipsets. A circuit board is shown at 794.

The user may control user device using a user interface 795, which may comprise at least one of a keypad, voice command apparatus, touch sensitive screen, touch sensitive pad, etc. A speaker and a microphone may also be provided in some examples. A display 794 may also be provided.

User device 790 may comprise connection points (wired or wireless) to other device or external accessories (e.g. an image receiving apparatus) 798.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage or memory for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

More generally, a first aspect of the present disclosure relates to a method for building up a model of a real-world environment, the method comprising: receiving, from a user device at a first location, first image information of a surrounding environment of the user device; determining further image information of the surrounding environment of the user device at the first location, wherein the further image information is required for generating a spatial anchor in the model, wherein the spatial anchor point links the first real-world location of the user device to a corresponding location in the model; providing guidance information to the user device for capturing the further image information; receiving the further image information from the user device; and generating a spatial anchor point in the model based on the first image information and the further image information; wherein following generation of the spatial anchor point, the spatial anchor point is discoverable to one or more users of the model to provide information of the first location.

In embodiments, the guidance information may comprise audio guidance.

In embodiments, the method may comprise, prior to providing the guidance information, determining that the first image information of the surrounding environment does not satisfy one or more quality thresholds, wherein the one or more quality thresholds comprise at least one of: a minimum light level threshold of the surrounding environment of the user device; a maximum speed of movement threshold of the user device; one or more maximum tilt angle thresholds of the user device; a minimum coverage level threshold of a 360 degree view of the surrounding environment of the user device.

In embodiments, the guidance information may provide one or more instructions for moving the user device to capture one or more sections of the surrounding environment of the user not included in the first image information.

In embodiments, the method may comprise determining the one or more sections not included in the first image information based on: a time period in which the user device captured the first image information; acceleration readings of one or more accelerometers in the user device during the time period; and gyroscope readings of one or more gyroscopes in the user device during the time period.

In embodiments, the guidance information may comprise at least one of: instructions for changing a light level at the first location; instructions for changing a light sensitivity of the user device; instructions for changing a tilt angle of the user device; instructions for changing a speed of movement of the user device.

In embodiments, the model may comprises at least one further spatial anchor point; wherein the one or more users of the model can receive navigation information, based on the model, from one or more devices, the navigation information for navigating between the generated spatial anchor and the at least one further spatial anchor in the model, wherein navigating between the generated spatial anchor and the at least one further spatial anchor in the model is performed by the one or more users moving physically in the real-world.

A second aspect relates to an apparatus for building up a model of a real-world environment, the apparatus comprising: at least one processor; and at least one memory including computer program code, the at least one memory and computer program code configured to, with the at least one processor, cause the apparatus to perform: receiving, from a user device at a first location, first image information of a surrounding environment of the user device; determining further image information of the surrounding environment of the user device at the first location, wherein the further image information is required for generating a spatial anchor in the model, wherein the spatial anchor point links the first real-world location of the user device to a corresponding location in the model; providing guidance information to the user device for capturing the further image information; receiving the further image information from the user device; and generating a spatial anchor point in the model based on the first image information and the further image information; wherein following generation of the spatial anchor point, the spatial anchor point is discoverable to one or more users of the model to provide information of the first location.

In embodiments, the guidance information comprises audio guidance.

In embodiments, the at least one memory and computer program code is configured to, with the at least one processor, cause the apparatus to perform: prior to providing the user guidance, determining that the first image information of the surrounding environment is below one or more quality thresholds, wherein the one or more quality thresholds comprises at least one of: a minimum light level threshold of the surrounding environment of the user device; a maximum speed of movement threshold of the user device; one or more maximum tilt angle thresholds of the user device; a minimum coverage level threshold of a 360 degree view of the surrounding environment of the user device.

In embodiments, the guidance information provides one or more instructions for moving the user device to capture one or more sections of the surrounding environment of the user not included in the first image information.

In embodiments, the at least one memory and computer program code is configured to, with the at least one processor, cause the apparatus to perform: determining the one or more sections not included in the first image information based on: a time period in which the user device captured the image information; acceleration readings of one or more accelerometers in the user device during the time period; gyroscope readings of one or more gyroscopes in the user device during the time period.

In embodiments, the guidance information comprises at least one of: instructions for changing a light level at the first location; instructions for changing a light sensitivity of the user device; instructions for changing a tilt angle of the user device; instructions for changing a speed of movement of the user device.

In embodiments, the model comprises at least one further spatial anchor point; and wherein the one or more users of the model can receive navigation information, based on the model, from one or more devices, the navigation information for navigating between the generated spatial anchor and the at least one further spatial anchor in the model, wherein navigating between the generated spatial anchor and the at least one further spatial anchor in the model is performed by the one or more users moving physically in the real-world.

A third aspect relates to a computer-readable storage device comprising instructions executable by a processor for: receiving, from a user device at a first location, first image information of a surrounding environment of the user device; determining further image information of the surrounding environment of the user device at the first location, wherein the further image information is required for generating a spatial anchor in the model, wherein the spatial anchor point links the first real-world location of the user device to a corresponding location in the model; providing guidance information to the user device for capturing the further image information; receiving the further image information from the user device; and generating a spatial anchor point in the model based on the first image information and the further image information; wherein following generation of the spatial anchor point, the spatial anchor point is discoverable to one or more users of the model to provide information of the first location.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A method comprising:
receiving, from a user device at a real-world location, first image information of a surrounding environment of the user device, the first image information being based on movement of the user device in a first shape;
determining that a certain angular range of the movement in the first shape has been reached;
receiving further image information, absent from the first image information, of the surrounding environment of the user device at the real-world location, the further image information being based on movement of the user device in a second shape;
determining that a certain angular range of the movement in the second shape has been reached; and
generating a spatial anchor point in a model of a real-world environment based on the first image information and the further image information, wherein the generated spatial anchor point links the real-world location of the user device to a corresponding location in the model of the real-world environment.

2. The method according to claim 1, further comprising:
recognizing a physical object in the first image information;
receiving the further image information from the user device after determining that a certain angular range of the movement in the first shape has been reached; and
providing interaction instructions to the user device, the interaction instructions including an instruction for interacting with the physical object.

3. The method according to claim 2, further comprising:
determining an orientation of the user device at the spatial anchor point; and
providing navigation instructions to the user device for navigating from the spatial anchor point to a second spatial anchor point in the model of the real-world environment,
wherein the second spatial anchor point corresponds to a second real-world location.

4. The method of claim 3, wherein the navigation instructions are provided by haptic feedback.

5. The method according to claim 2, further comprising:
determining that a first part of the physical object is missing from the first image information,
wherein receiving the further image guidance information further comprises capturing a second part of the physical object missing from the first image information.

6. The method of claim 5, wherein the first part of the physical object and the second part of the physical object are the same part of the physical object.

7. The method according to claim 1, further comprising:
determining that the first image information of the surrounding environment is missing a full 360-degree view of the surrounding environment of the user device,
wherein receiving the further image information further comprises turning the user device around to receive the further image information.

8. The method according to claim 1, further comprising:
determining that the first image information of the surrounding environment fails to satisfy a light-level quality threshold prior to receiving the further image information.

9. The method of claim 1, wherein the first shape and the second shape are the same shape.

10. An apparatus comprising:
a processor; and
a memory storing computer program code that, when executed by the processor, cause the apparatus to:
receive, from a user device at a real-world location, first image information of a surrounding environment of the user device, the first image information being based on movement of the user device in a first shape;
determine that a certain angular range of the movement in the first shape has been reached;
receive further image information, absent from the first image information, of the surrounding environment of the user device at the real-world location, the further image information being based on movement of the user device in a second shape;

determine that a certain angular range of the movement in the second shape has been reached; and generate a spatial anchor point in a model of a real-world environment based on the first image information and the further image information, wherein the generated spatial anchor point links the real-world location of the user device to a corresponding location in the model of the real-world environment.

11. The apparatus according to claim 10, wherein the computer program code, when executed by the processor, further causes the apparatus to:

recognize a physical object in the first image information;

receive the further image information from the user device after determining that a certain angular range of the movement in the first shape has been reached; and provide interaction instructions to the user device, the interaction instructions including an instruction for interacting with the physical object.

12. The apparatus according to claim 11, wherein the computer program code, when executed by the processor, further causes the apparatus to:

determine an orientation of the user device at the spatial anchor point; and provide navigation instructions to the user device for navigating from the spatial anchor point to a second spatial anchor point in the model of the real-world environment, wherein the second spatial anchor point corresponds to a second real-world location.

13. The apparatus of claim 12, wherein the navigation instructions are provided by haptic feedback.

14. The apparatus according to claim 11, wherein the computer program code, when executed by the processor, further causes the apparatus to:

determine that a first part of the physical object is missing from the first image information, wherein receiving the further image information further comprises capturing a second part of the physical object missing from the first image information.

15. The apparatus of claim 14, wherein the first part of the physical object and the second part of the physical object are the same part of the physical object.

16. The apparatus according to claim 11, wherein the computer program code, when executed by the processor, further causes the apparatus to:

determine that the first image information of the surrounding environment is missing a full 360-degree view of the surrounding environment of the user device, wherein receiving the further image information further comprises turning the user device around to capture the further image information.

17. The apparatus according to claim 10, wherein the computer program code, when executed by the processor, further causes the apparatus to:

determine that the first image information of the surrounding environment fails to satisfy a light-level quality threshold prior to receive the further image information.

18. The apparatus of claim 10, wherein the first shape and the second shape are the same shape.

19. A computer-readable storage device implemented in hardware and comprising instructions executable by a processor for:

receiving, from a user device at a real-world location, first image information of a surrounding environment of the user device, the first image information being based on movement of the user device in a first shape;

determining that a certain angular range of the movement in the first shape has been reached;

receiving further image information, absent from the first image information, of the surrounding environment of the user device at the real-world location, the further image information being based on movement of the user device in a second shape;

determining that a certain angular range of the movement in the second shape has been reached; and generating a spatial anchor point in a model of a real-world environment based on the first image information and the further image information, wherein the generated spatial anchor point links the real-world location of the user device to a corresponding location in the model of the real-world environment.

20. The computer-readable storage device of claim 19, wherein the first shape and the second shape are the same shape.

* * * * *